UNITED STATES PATENT OFFICE.

EBEN N. HORSFORD, OF CAMBRIDGE, MASSACHUSETTS.

IMPROVED COMPOSITION FOR FILLING FIRE-PROOF SAFES.

Specification forming part of Letters Patent No. 39,921, dated September 15, 1863.

*To all whom it may concern:*

Be it known that I, EBEN NORTON HORSFORD, of Cambridge, in the county of Middlesex and State of Massachusetts, have invented or discovered a certain new and useful Composition of Matter for Filling Fire-Proof Safes or Chests, of which the following is a full, clear, and exact description.

The particular object I have in view in the invention claimed under this patent is to introduce into the water-tight compartments or cavities of a fire-proof safe a porous body, which will hold in suspension the greatest possible quantity of water.

Calcined gypsum, it is well known, possesses great capacity for absorbing moisture. I have discovered by experiment that this capacity is very much increased by gelatinizing the water before mixing it with the gypsum to form the filling. Thus, if gelatinized water (derived by combining with a given quantity of water the minimum quantity of a substance that will gelatinize it) be mixed with the gypsum, a compound will be obtained four-fifths of the volume of which will be water. This discovery has enabled me to obtain most astonishing results in resisting the action of fire, developing a heat-resisting power heretofore unattained.

The filling I employ is made in the following manner: To every seventy pounds of cold water I add, with constant stirring, two pounds of starch and gelatinize the same thoroughly by boiling. To this solution, when cold, I add fifty pounds of plaster-of-paris by gradually sifting it in and constantly stirring the mixture. The above-mentioned proportions are the best, so far as I have been enabled to judge by experiment; but they may be varied somewhat without materially affecting the result. There are many chemical equivalents both for the starch and plaster, well known to chemists, which might be substituted for them; but for practical use I prefer the ingredients named. The starch renders the solution viscid, thereby increasing the capillary power of the set plaster to retain water and the non-conducting property of the plaster after the moisture is expelled.

I deem it unnecessary here to describe in detail the general construction of a fire-proof safe, as such construction forms no part of the subject-matter herein claimed, and is moreover fully described in two other patents issued to me simultaneously with this one.

It is obvious that instead of starch many other gelatinizing substances can be used in very small quantities in connection with water and gypsum for the purpose above set forth—as, for example, gum-arabic, potatoes, gelatinous sea-weed, dextrine, glue, gum-tragacanth, prepared isinglass, fish-glue, and other animal and vegetable substances capable of gelatinizing water have been used by me, with varying results, all being more or less useful. I have, however, obtained the best results from gelatine extracted from sea-weed, and prefer it to all other substances. In other words, I prefer that substance which is capable of gelatinizing the greatest quantity of water.

My attention has been called to a patent of John Farrell, dated July 19, 1853, for the use of flour, grain, maize, rye, starch, or other vegetable substances of a like nature, either alone or in combination with cement or similar substances. In order that my invention may be fully understood, I desire to state that my invention is altogether different from this, and produces different results by means of a wholly different nature. The patent in that case describes the formation of a thick dough of flour or similar substances and mixing with it lime, plaster, or cement in order to make it hard and solid, and states that the substance thus formed, when exposed to heat, is deprived of its latent moisture, becomes carbonized, and thus remains a non-conductor of heat. I use the least quantity of starch or other substance that, when incorporated and boiled with the amount of water I intend to use, will perfectly gelatinize it, the proportion being about two pounds of starch to about seventy pounds of water, thus producing a fluid which, it is quite obvious, could neither be used as a dough nor as a filling in the sense in which it is used in Farrell's patent. I then incorporate this fluid with calcined gypsum, not for the purpose of making my starch "hard and solid," as Mr. Farrell does, but for the purpose of enabling my gypsum, by means of the chemical and physical properties of the boiled starch, to retain an exceedingly large quantity of water.

The substance which I thus produce is in volume about four-fifths water. It is not a dough set and made hard by the use of lime or gypsum, but is an altogether new and peculiar composition of matter. Instead of being a vegetable substance which could be carbonized by exposure to heat, it is, after the water is driven off, substantially an earthy substance incapable of carbonization.

For the above reasons I do not claim the use of flour, grain, maize, starch, or similar vegetable substances made into a dough and set by means of lime, cement, or plaster, as described in said Farrell's patent.

I claim—

As a new composition of matter for filling safes to render them fire-proof, calcined and powdered gypsum mixed with gelatinized water, substantially in the manner and proportions described.

In testimony whereof I have hereunto subscribed my name.

E. N. HORSFORD.

Witnesses:
  A. POLLOK,
  LAWRENCE A. SNEDEN.